US012663877B1

(12) United States Patent (10) Patent No.: US 12,663,877 B1
Miramontes (45) Date of Patent: Jun. 23, 2026

(54) HANDHELD ELECTRONIC DEVICE AND METHOD

(71) Applicant: Ivan Miramontes, Fontana, CA (US)

(72) Inventor: Ivan Miramontes, Fontana, CA (US)

( * ) Notice: Subject to any disclaimer, the term of this patent is extended or adjusted under 35 U.S.C. 154(b) by 0 days.

(21) Appl. No.: 19/058,230

(22) Filed: Feb. 20, 2025

Related U.S. Application Data

(60) Provisional application No. 63/630,741, filed on Feb. 27, 2024.

(51) Int. Cl.
　*G06F 3/02* (2006.01)
　*G06F 3/0354* (2013.01)

(52) U.S. Cl.
　CPC .......... *G06F 3/0227* (2013.01); *G06F 3/0354* (2013.01)

(58) Field of Classification Search
　CPC .............................. G06F 3/0227; G06F 3/0354
　See application file for complete search history.

(56) References Cited

U.S. PATENT DOCUMENTS 8,775,966 B2　7/2014　Stolyarov
10,627,947 B2 *　4/2020　Kono ...................... G06F 3/044

| | | | |
|---|---|---|---|
| 2005/0246652 A1 * | 11/2005 | Morris ................. | G06F 1/1616 |
| | | | 715/773 |
| 2006/0084482 A1 * | 4/2006 | Saila ..................... | G06F 1/1662 |
| | | | 455/575.1 |
| 2007/0063969 A1 * | 3/2007 | Wright ................. | G06F 1/1616 |
| | | | 345/645 |
| 2011/0012921 A1 * | 1/2011 | Cholewin .............. | G06F 3/041 |
| | | | 345/173 |
| 2013/0007653 A1 * | 1/2013 | Stolyarov .......... | G06F 3/04845 |
| | | | 345/173 |
| 2014/0009415 A1 * | 1/2014 | Nishida ................ | G06F 3/0416 |
| | | | 345/173 |
| 2014/0164976 A1 * | 6/2014 | Kim ..................... | G06F 3/0416 |
| | | | 345/173 |
| 2014/0340324 A1 * | 11/2014 | Xiao ...................... | G06F 3/041 |
| | | | 345/173 |
| 2017/0017388 A1 * | 1/2017 | Heo ...................... | G06F 3/0346 |
| 2017/0102810 A1 * | 4/2017 | Satake ............... | G06F 3/03547 |
| 2024/0393933 A1 | 11/2024 | de Vries | |

* cited by examiner

*Primary Examiner* — Jonathan A Boyd
(74) *Attorney, Agent, or Firm* — Ted Masters

(57) ABSTRACT

A handheld electronic device includes a front side having a display screen, and a rear side disposed opposite the front side. An input unit is disposed on the rear side. The input unit is ergonomically positionable to a plurality of different locations on the rear side, so that when the electronic device is gripped the input unit aligns with the finger of the user. The ergonomical positioning of the input unit customizes the device to the hand and finger of the user.

11 Claims, 12 Drawing Sheets

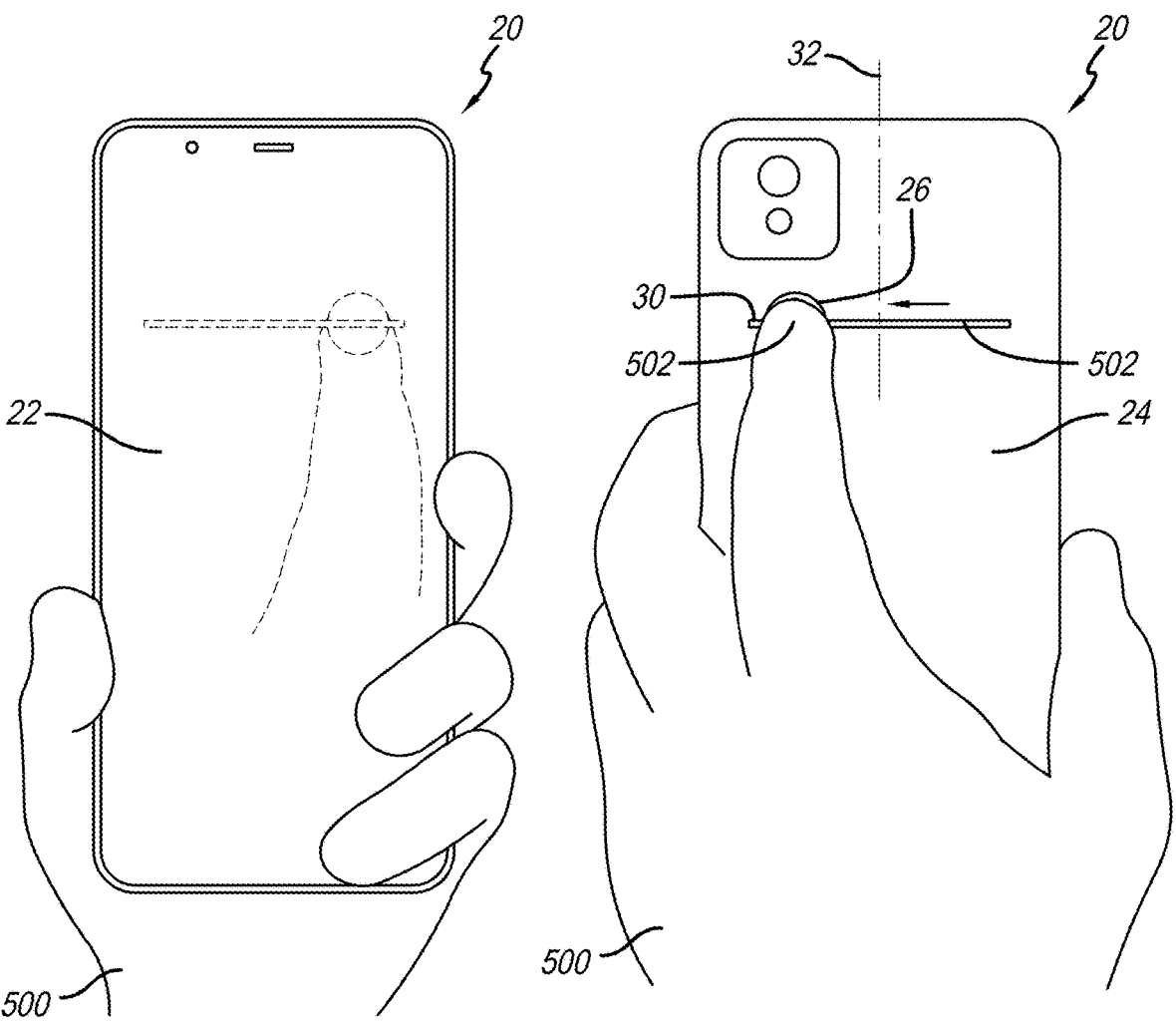
FIG. 4 FIG. 5

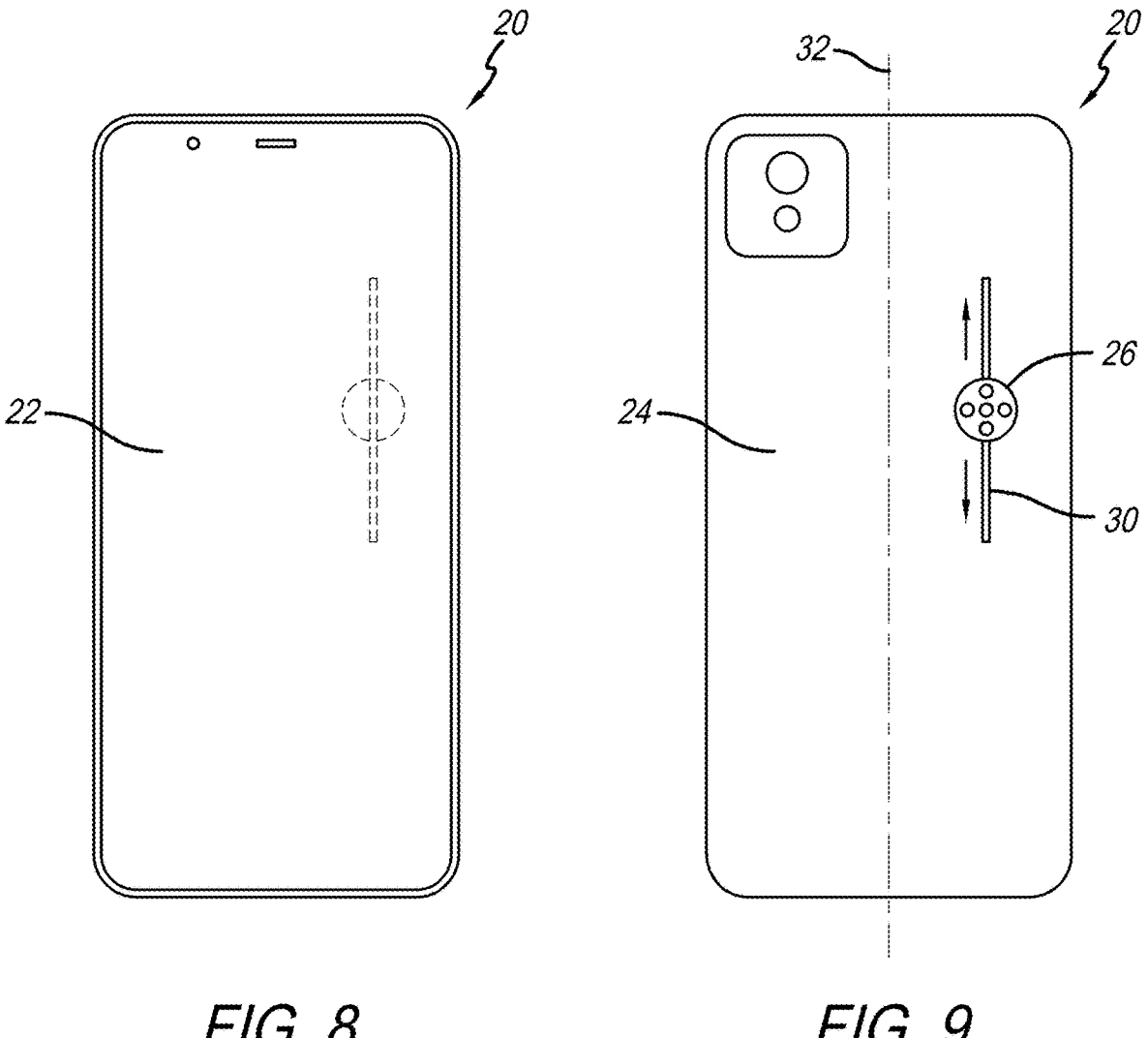
*FIG. 8*　　　　　　　*FIG. 9*

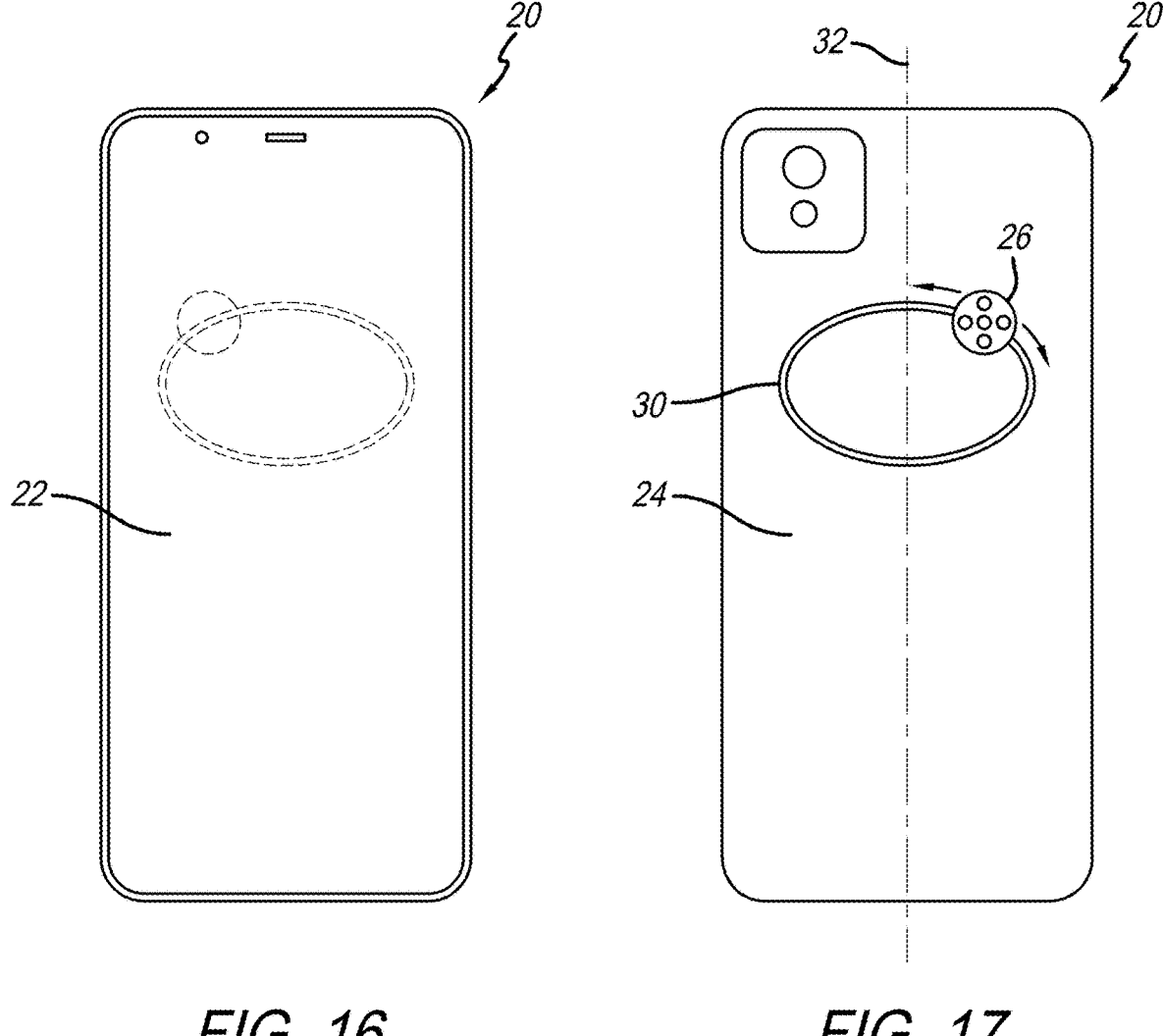
*FIG. 16*          *FIG. 17*

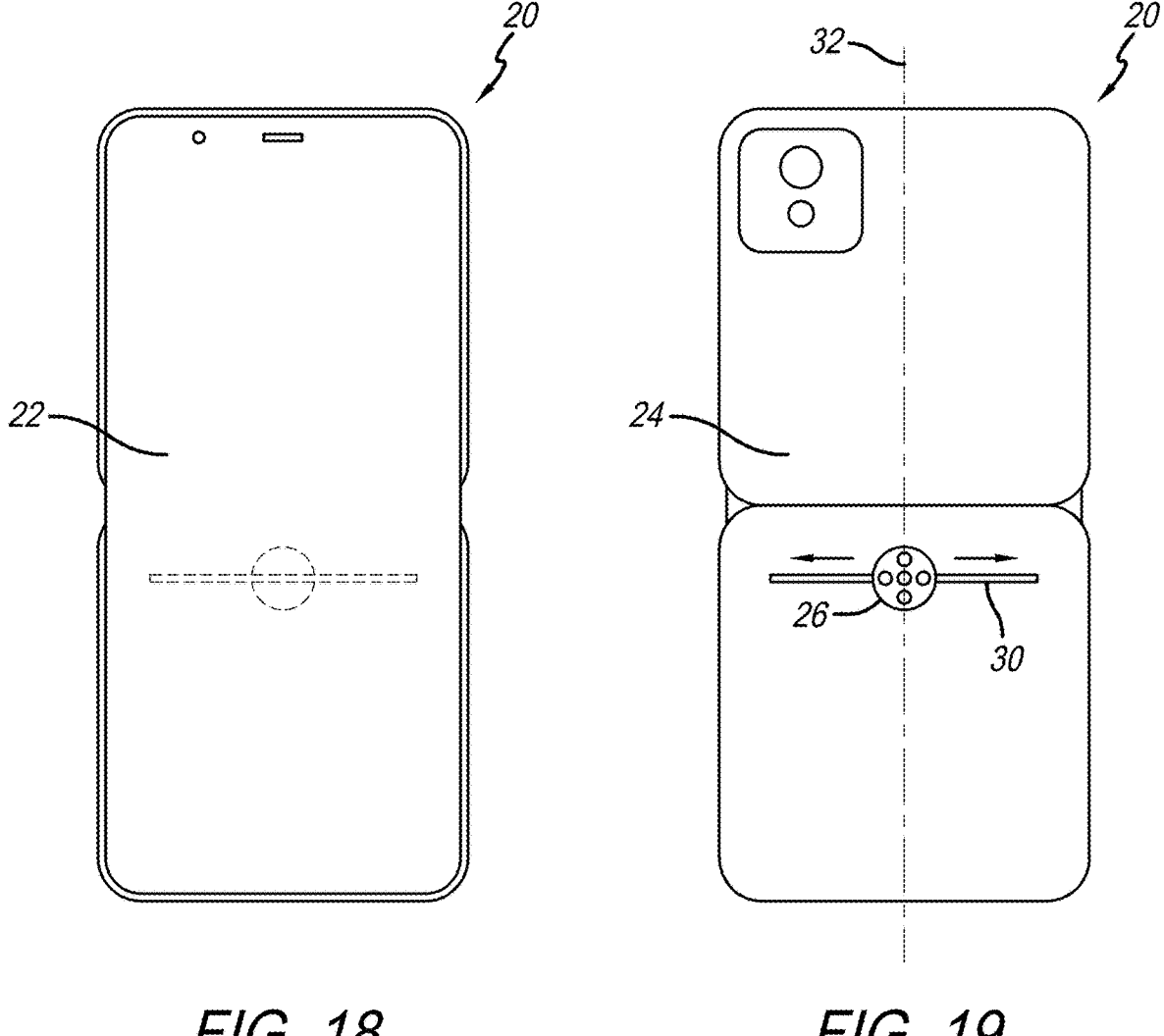
FIG. 18                          FIG. 19

HANDHELD ELECTRONIC DEVICE AND METHOD

CROSS REFERENCE TO RELATED APPLICATION

This application claims the filing benefit under 35 U.S.C. § 119 (e) of U.S. Provisional Application No. 63/630,741, filed Feb. 27, 2024, which is hereby incorporated by reference.

TECHNICAL FIELD

The present invention is directed to handheld electronic devices, and more particularly to a handheld electronic device which includes an ergonomically positionable input unit.

BACKGROUND OF THE INVENTION

Touchscreens are common in handheld electronic devices such as smartphones, tablets, hand-held game consoles, and the like. A user can give input or control the information processing system through simple or multi-touch gestures by touching the screen with a special stylus or one or more fingers. The user can use the touchscreen to react to what's displayed and, if the software allows, to control how it is displayed; for example, camera zooming to take a photo or video. The use of the touchscreen requires the user to hold the device in one hand and manipulate the touchscreen with the other hand.

In another type of handheld device a controller is located on the rear side of the touchscreen, and can be operated with the same hand which is holding the device.

BRIEF SUMMARY OF THE INVENTION

The present invention is directed to an handheld electronic device which can be operated with just one hand. This is made possible by incorporating an input unit on the rear side of the device opposite the touchscreen. The input unit can be operated by the same hand that is holding the handheld electronic device, thus freeing the opposite hand for other tasks. Moreover, the present invention permits the user to customize the rear side location of the aforementioned input unit to fit his or her hand, thereby making the operation of the input unit ergonomically optimal. In an embodiment the position of the input unit is made to align with the position of the user's finger when the device is gripped in the hand. As such the user's finger is disposed adjacent the input unit and can be easily used to operate the unit. As such, stretching, contracting, contorting or other awkward movements of the finger are avoided.

Accordingly, the present invention provides an ergonomic input unit which can be adapted for use by both right and left handers. Additionally the invention facilitates user control of the device with one hand, and does not require the other hand to control and possible block view of the display screen.

In accordance with an embodiment a handheld electronic device includes a front side having a display screen. A rear side is disposed opposite the front side. An input unit is disposed on the rear side, the input unit being ergonomically positionable to a plurality of different locations on the rear side.

In accordance with another embodiment, the input device includes a plurality of switches.

In accordance with another embodiment, the input device includes five switches.

In accordance with another embodiment, the rear side has a longitudinal centerline. A path is disposed on the rear side, and the input unit is positionable along the path.

In accordance with another embodiment, the path is disposed parallel to the longitudinal centerline.

In accordance with another embodiment, the path is disposed perpendicular to the longitudinal centerline.

In accordance with another embodiment, the path is one of a circle, a rectangle, and an ellipse.

In accordance with another embodiment, the input unit is positionable by computer control.

Other embodiments, in addition to the embodiments enumerated above, will become apparent from the following detailed description, taken in conjunction with the accompanying drawings, which illustrate, by way of example, the principles of the handheld electronic device and method.

BRIEF DESCRIPTION OF THE DRAWINGS

FIG. 4 is a front elevation view of the handheld electronic device being held in one hand by a user with the input unit adjacent a finger;

FIG. 5 is a rear elevation view of FIG. 4;

FIG. 8 is a front elevation view of the handheld electronic device having a vertically positionable input unit;

FIG. 9 is a rear view of FIG. 8;

FIG. 16 is a front elevation view of the handheld electronic device having an elliptically positionable input unit;

FIG. 17 is a rear elevation view of FIG. 16;

FIG. 18 is a front elevation view of the another handheld electronic device;

FIG. 19 is a rear elevation view of FIG. 18;

DETAILED DESCRIPTION OF THE INVENTION

Referring initially to FIGS. 1-5 there are illustrated various views of a handheld electronic device 20. Handheld electronic device 20 includes a front side 22 which has a display screen (such as a touchscreen). In the shown embodiment handheld electronic device 20 is a smartphone, however the principles of the present invention can also be applied to other electronic devices such as flip smartphones, PDAs, tablet computers, handheld gaming devices, or any other handheld device which would profit from the concepts presented herein.

Handheld electronic device 20 further includes a rear side 24 disposed opposite front side 22. In the shown smartphone embodiment rear side 24 includes primary camera lenses. An input unit 26 is disposed on rear side 24. Input unit 26 is ergonomically positionable to a plurality of different locations on rear side 24. As used herein "ergonomical positioning" means that the entire input unit 26 can be selectively positioned by a user to a desired physical location on rear side 24; so that when the user grips the electronic device 20 a finger of the user's gripping hand (typically the tip of the index finger) is disposed adjacent input unit 26, and can be used to manually operate input unit 26 which in turn transmits commands to the computer system of the handheld electronic device 20 to effect a desired performance.

The positioning of input unit 26 is governed by parameters such as the hand which is used (right or left), the size of the user's hand, the length of the user's fingers, and the gripping location on the handheld electronic device 20. In the shown embodiment input unit 26 is slidably positionable along a straight path as is discussed below. It is further noted that ergonomic (ergonomically) positioning of input unit 26 means physically moving the entire input unit 26 to a different location on rear side 24, and specifically does not include moving individual components of input unit 26, such as moving rollers, joysticks, depressing switches and the like.

Figures 1, 2, 3:
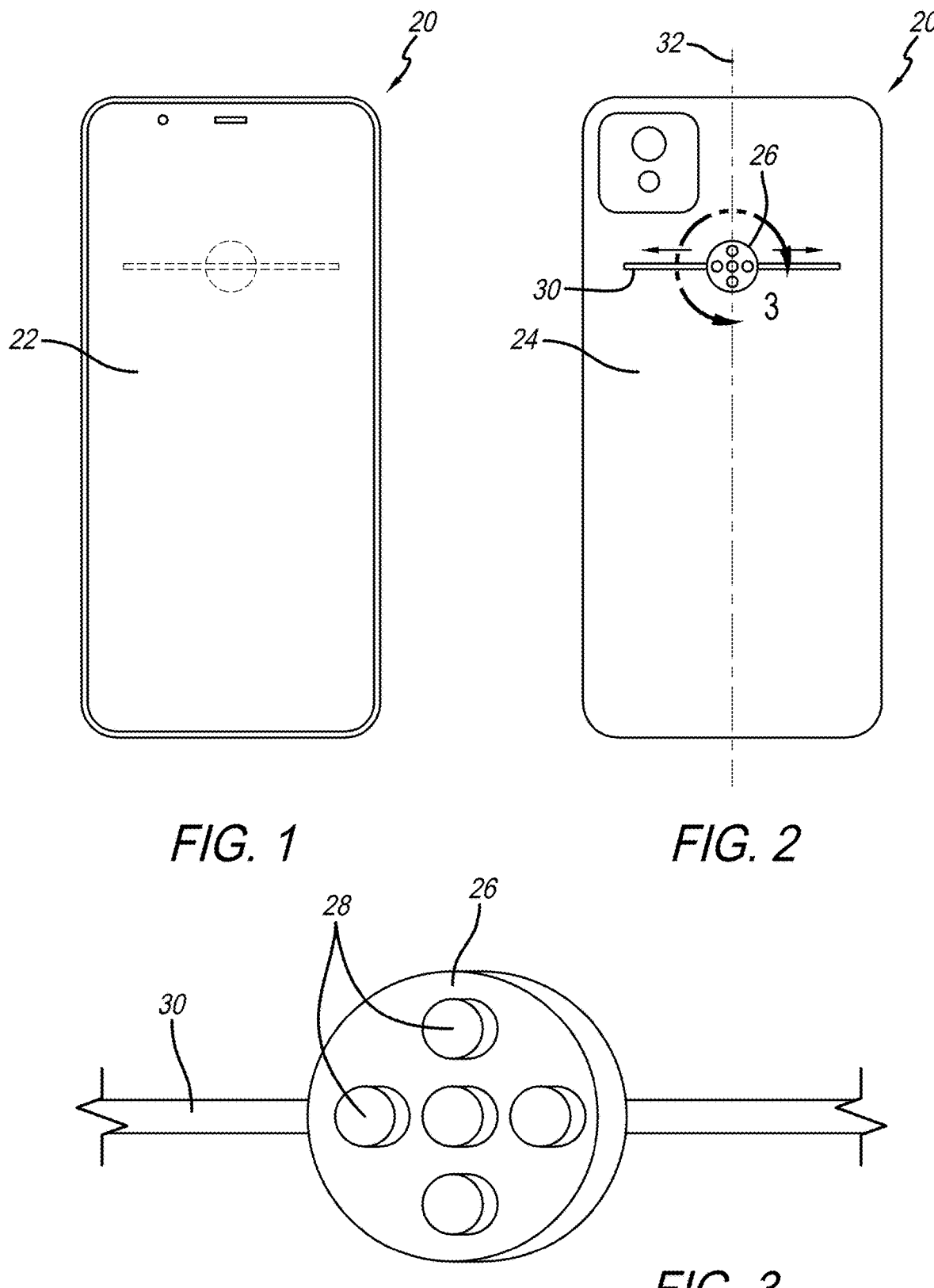
FIG. 1 is front elevation view of a handheld electronic device having a horizontally positionable input unit.
FIG. 2 is a rear elevation view of the handheld electronic device.
FIG. 3 is an enlarged perspective view of area 3-3 of FIG. 1.

FIG. 3 shows an enlarged perspective view of input unit 26. In an embodiment input unit 26 includes a plurality of switches 28 (five as shown), which can be used by the user to input commands to the computer system of the handheld electronic device 20. For example the five switches 28 could form a navigation pad with up/down, right/left, and execute (center). However it may be appreciated that other types of input devices 26 could also be used such as other types and numbers of switches, a touchpad, a roller, a joystick, a scanner, or a combination of the aove. In another embodiment the function of switches 28 can be changed by providing manual or voice command inputs to the computer system of the handheld electronic device 20.

Rear side 24 of handheld electronic device 20 has a path 30. Input unit 28 is positionable along path 30 to different locations on rear side 24. In the shown embodiment path 30 is disposed perpendicular to a longitudinal centerline 32 of rear side 24. In FIGS. 1-2 input unit 26 is in a mid-position along path 30. In FIGS. 4-5 input unit 26 has been ergonomically positioned to the right (in FIG. 4) along path 30 so that it will align with the finger 502 of the left hand 500 of a user. In FIG. 5 It is noted that when the user grips handheld electronic device 20 the index finger 502 naturally angles to the tight across centerline 32. Input unit 26 is therefore moved to the right so that it will align with finger 502. The positioning of input unit 26 along path 30 can either be manually performed by the user, or effected under computer control such as by using the touchscreen of front side 22. Other path 30 configurations are outlined below. Also discussed below is the mechanical design of path 30.

Figures 6, 7:
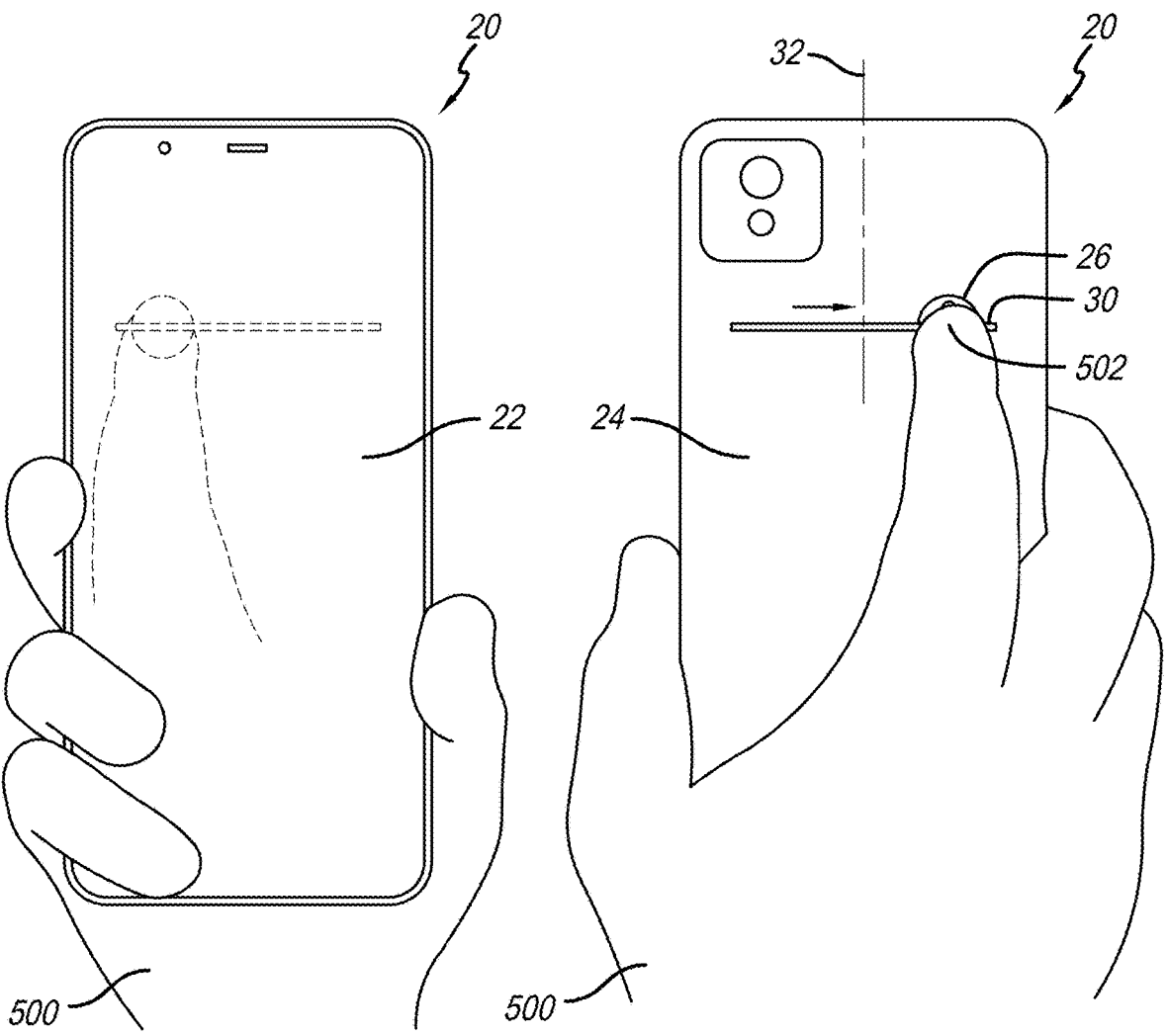
FIG. 6 is a front elevation view of the handheld electronic device being held in the opposite hand from FIG. 4.
FIG. 7 is a rear elevation view of FIG. 6.

FIGS. 6-7 show input unit 26 ergonomically positioned for use by a right hand of the user. That is, input unit 26 has be moved along path 30 and is disposed on the opposite side of longitudinal centerline 32, so that it aligns with the finger 502 of right hand 500.

FIGS. 8-9 are a front and rear elevation views of the handheld electronic device 20 having a vertically positionable input unit. 26 In this embodiment path 30 is disposed parallel with longitudinal center line 32. This embodiment is useful for ergonomically adapting handheld electronic device 20 to larger or smaller of left hands 500.

Figures 10, 11:
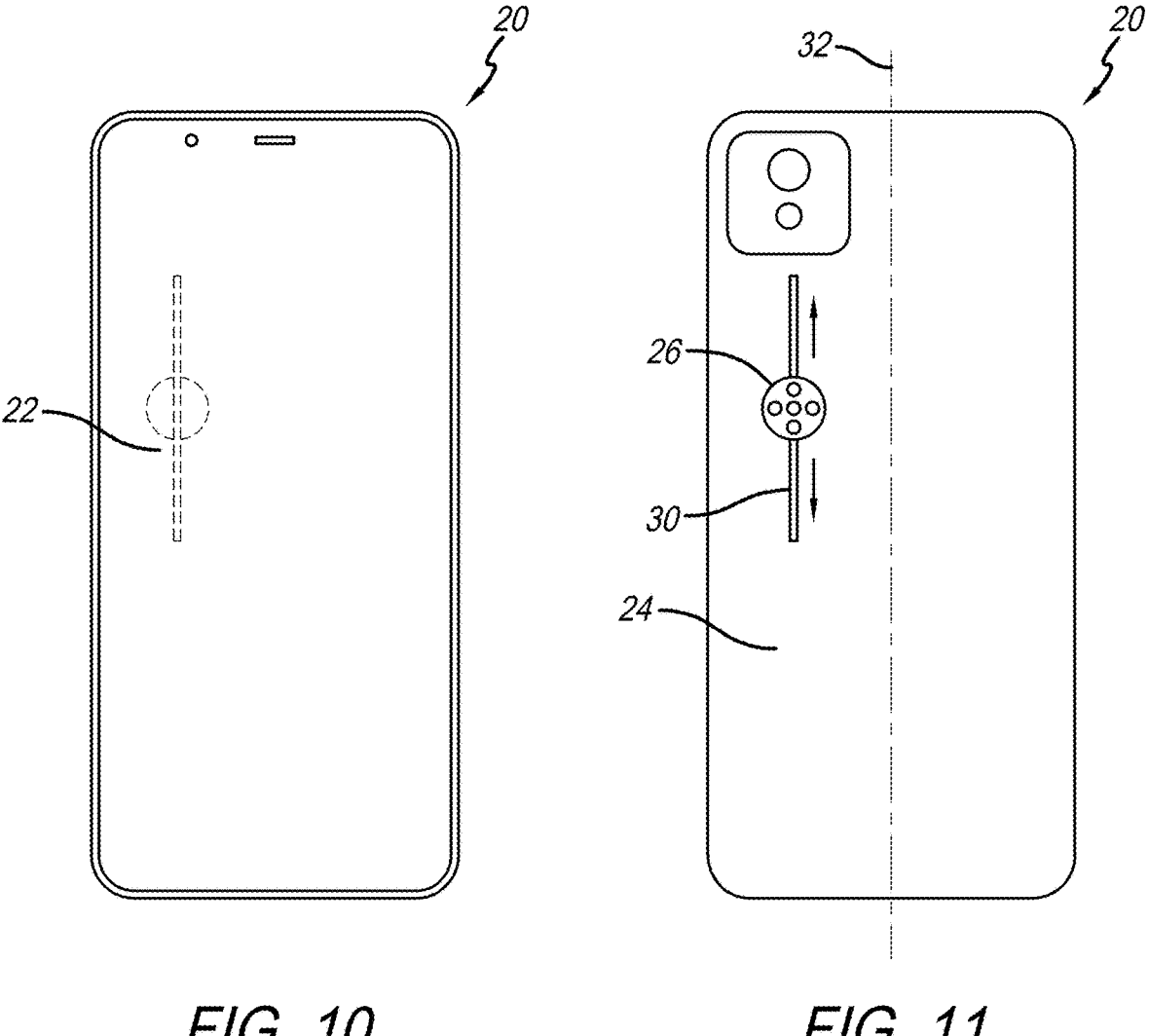
FIG. 10 is a front elevation view of the handheld electronic device with the input unit located on an opposite side.
FIG. 11 is a rear view of FIG. 10.

FIG. 10-11 are front and rear elevation views of the handheld electronic device with the input unit 26 located on an opposite side. This is the mirror image of FIGS. 8-9 and is useful for use with the right hand. It may be appreciated that the features of the embodiments of FIGS. 8-9 and 10-11 could be combined to have two vertical paths 30 which could accommodate both right and left hand use.

Figures 12, 13:
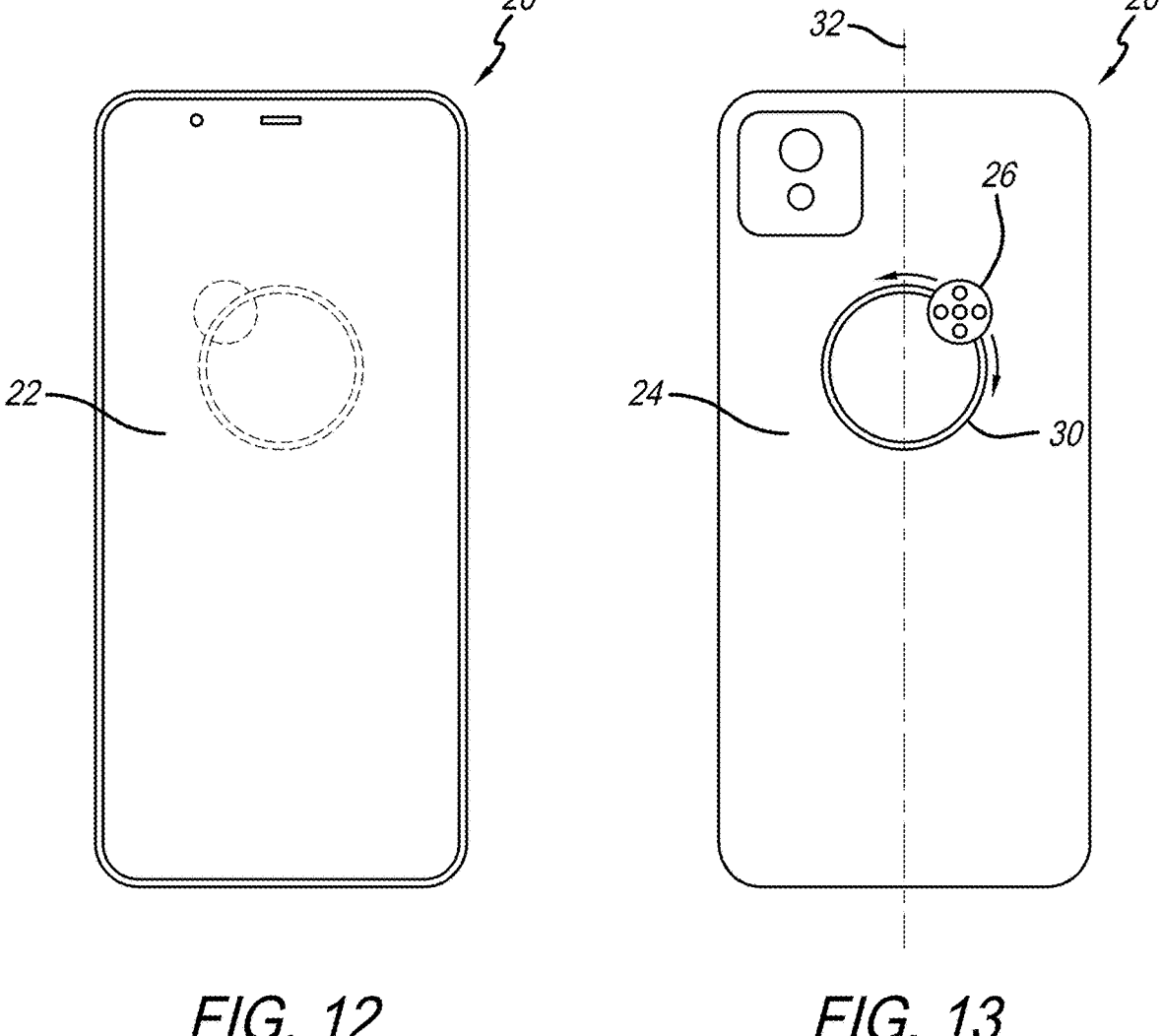
FIG. 12 is a front elevation view of the handheld electronic device having a circularly positionable input unit.
FIG. 13 is a rear elevation view of FIG. 12.

FIGS. 12-13 are front and rear elevation views of the handheld electronic device 20 having a circularly positionable input unit 26. That is, path 30 is a circle. As such, input unit 26 can be positioned both parallel with and perpendicular to longitudinal centerline 32, and therefore accommodate both right and left handed users.

Figures 14, 15:
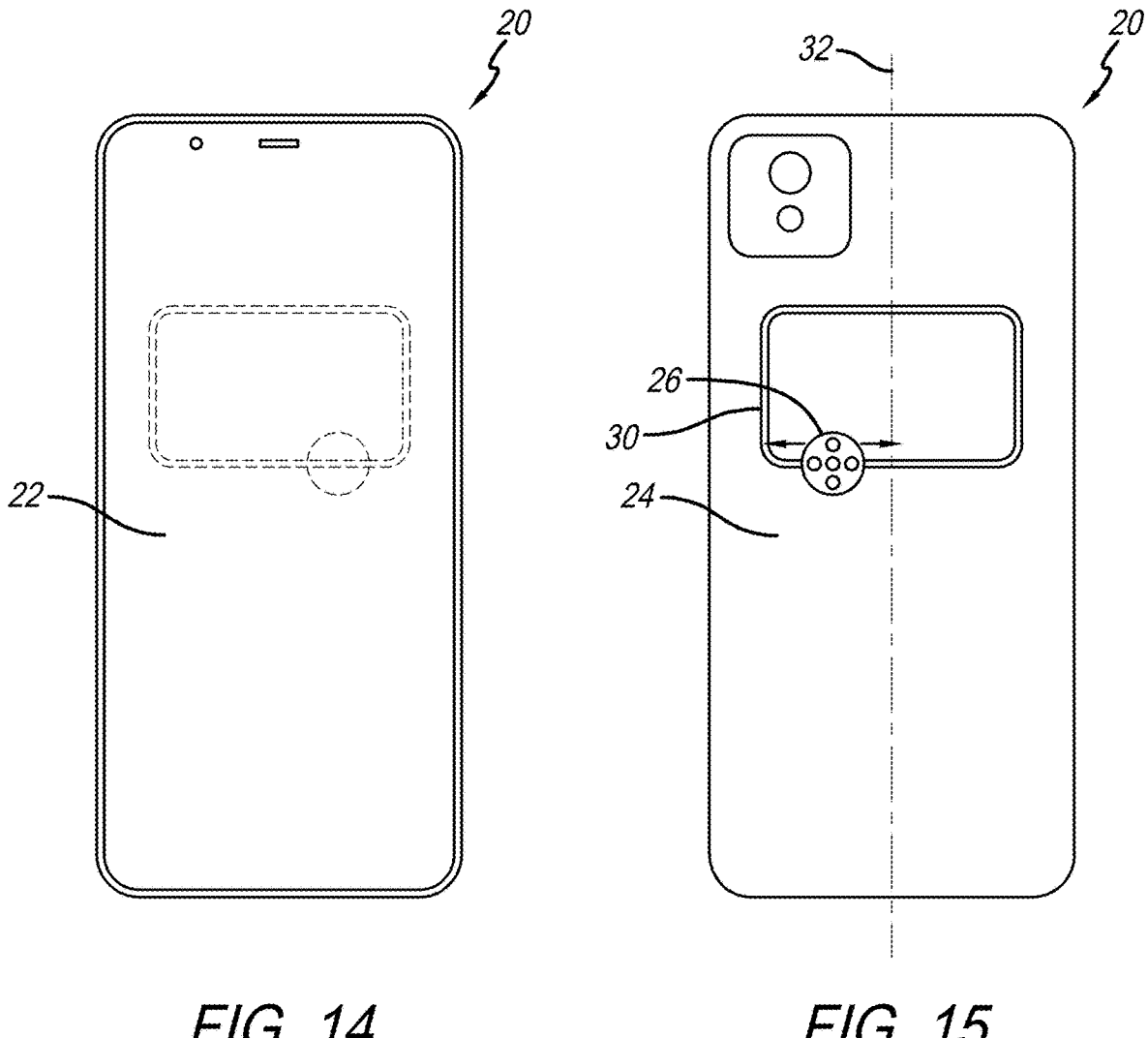
FIG. 14 is front elevation view of the handheld electronic device having a rectangularly positionable input unit.
FIG. 15 is a rear elevation view of FIG. 14.

FIGS. 14-15 are front and rear elevation views of the handheld electronic device 20 having a rectangular path 30. Path 30 is a rectangle, allowing positioning both parallel with and perpendicular to longitudinal centerline 32, and therefore also accommodating both right and left hand use.

FIGS. 16-17 are front and rear elevation views of the handheld electronic device 20 having an elliptical path 30. Path 30 is an ellipse, allowing positioning both parallel with and perpendicular to longitudinal centerline 32, and therefore also accommodating both right and left hand use.

FIGS. 18-19 are front and rear elevation views of another handheld electronic device 20, namely a flip smartphone. In this embodiment path 30 is perpendicular to longitudinal centerline 32 as in FIGS. 4-5.

Figure 20:
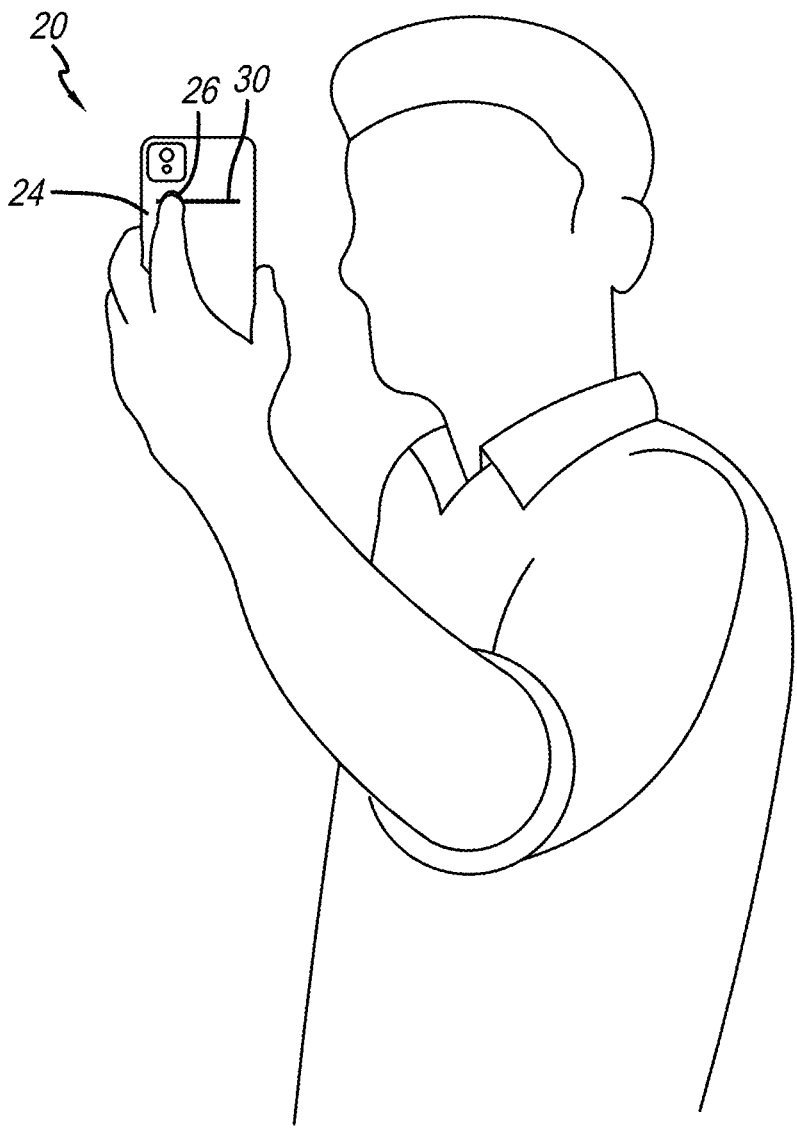
FIG. 20 is a reduced perspective view of a user using the handheld electronic device.

FIG. 20 is a reduced perspective view of handheld electronic device 20 being used by a user. It is noted that handheld electronic device 20 can be conveniently held in one hand with ergonomically positioned input unit 26 used to input commands to the computer system of the handheld electronic device 20. If needed, the opposite hand of the user is free to perform other tasks such as to use the touchscreen of the handheld electronic device 20.

It may be appreciated that in addition to the paths 30 along which input unit 26 may be moved which are cited above, other paths such as oval, trapezoidal, triangular, rhombic, or irregular could also be utilized.

Figure 21:
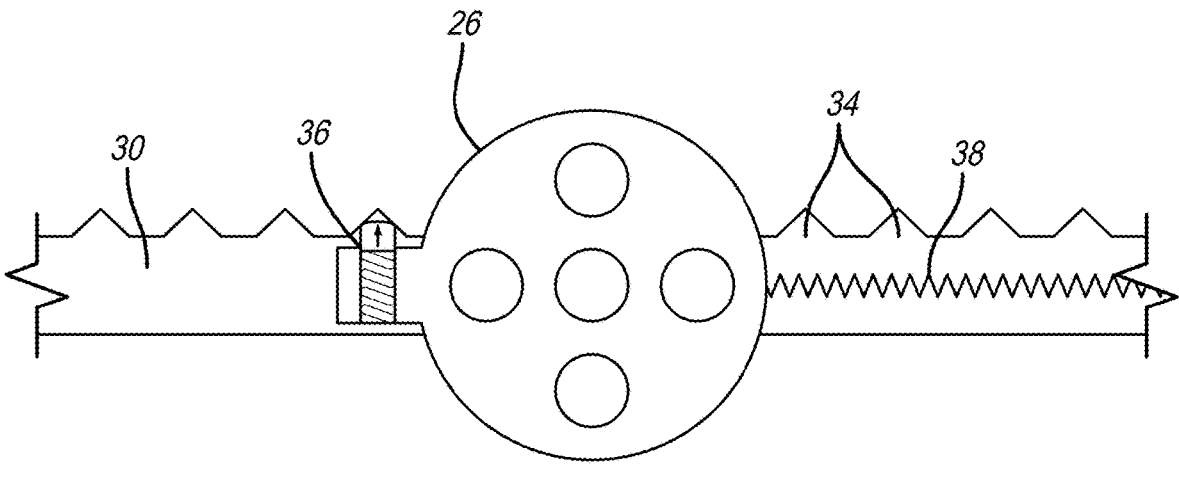
FIG. 21 is an enlarged top plan view of a positioning device in a first position.
Figure 22:
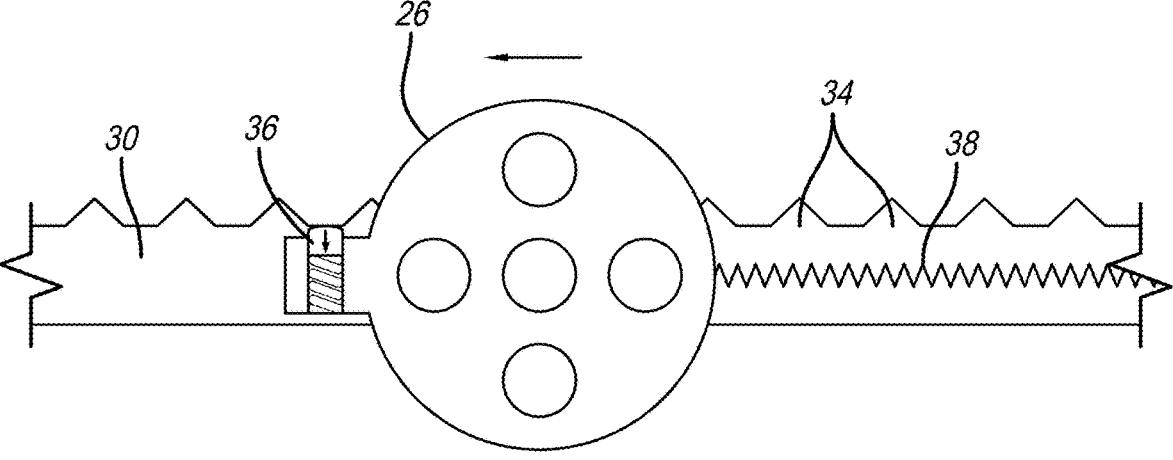
FIG. 22 is an enlarged top plan view of the positioning device in a second position; and, FIG. 23 is a diagram showing uses of the handheld electronic device.

Input unit 26 can be positioned in various ways known in the art. For example, FIGS. 21 and 22 show an enlarged top plan view of a positioning device that could be utilized. Input unit 26 is positionable along a slotted path 30 one side of which includes a plurality of spaced apert notches 34. Input unit 26 includes a spring loaded plunger 36 which in FIG. 22 is biased into one of the notches 34 forming a stable detent position for input unit 26. In FIG. 22 input unit 26 has be manually moved by the user to the left. As such, the spring of the spring loaded plunger 36 is compressed and the plunger 36 moves along an unnotched portion of slotted path 30 until it aligns with and engages the next notch 34. As such, input unit 26 can be positioned to and stably reside in a plurality of positions along path 30. A cord 38 electrically connects input unit 26 with the computer of handheld device 20. The strength of the spring determines how stable plunger 36 is when it engages a notch 34. Other embodiments can include a lock which fixedly locks in place (rather than a detent) input unit 26 in place along path 30. It may be appreciated that plunger 36 could be positioned so that it resides beneath input unit 26.

In another embodiment an auto-locking step sliding mechanism such as disclosed in U.S. Pat. Nos. 5,269,063 and 7,107,687 could be utilized. In yet another possible embodiment a rack and pinion gear train could be utilized. The rack and pinion could be specifically adapted to a positioning system which would automatically position input unit 26 under computer control (such as from user actions on the display screen (touchscreen).

Figure 23:
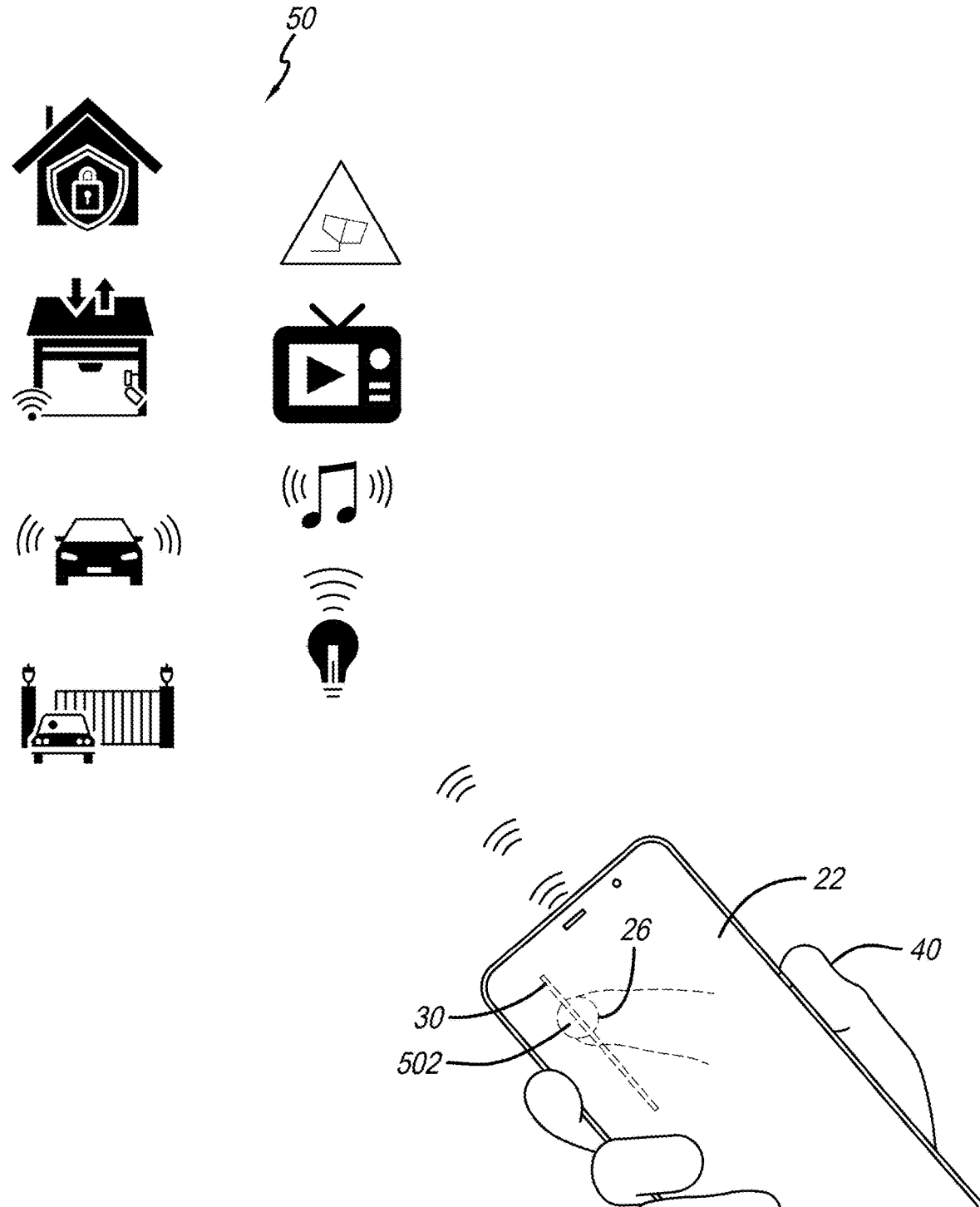

FIG. 23 is a diagram showing uses of handheld electronic device 20. 40 is an exclusive voice search command button which works in conjunction with input unit 26 in picking and launching a specific "remote control app" 50 (eight as shown) for navigating. Just press the button 40, make your voice request pick, when the "remote control app" appears on the device's screen 22, then just release the button 40. Now input unit 26 is ready to be used. Besides having button 40 on the side of device 20, it can be incorporated anywhere on rear side 24. In reference to button 40, the portable two-way wireless radio (walkie-talkie), push to talk feature was invented right before the second world war.

The present invention can be used to perform a variety of tasks. Examples of a five position input unit 26 (navigation pad) are:

1. Camera/Video application commands: Up (zoom out), Down (zoom in), Center (shoot), Left (switch cameras), Right (activate flash).
2. Vehicle remote control application commands, Up (lock), Center (start engine), Down (unlock). Note: Left and Right buttons are pre-set as dummies. The device user can add additional features such as opening trunk, etc.
3. Garage/Driveway remote control application commands: Center (open/close by single or double click), Up (on/off garage outdoor light), Down (other outdoor light), Right (driveway gate open/close), Left (dummy mode).
4. Home security remote control application commands: Center (On/Off main outdoor lighting), Up (access security camera/s), Down (On/Off main indoor lighting), Left (unlock/lock entrance door), Right (A/C or ceiling fan On).
5. TV remote control application commands: Standard directional pad Up/Down/Left/Right/Center to SELECT. Note: for volume lower/raise use the phone's physical standard side buttons.

It may be appreciated however that other button numbers and configurations can be utilized to implement other functions. Additionally input unit 26 can be positioned by a motor under control of the computer system of the handheld electronic device 20.

In each of the above cited examples the input unit buttons provide inputs to the computer system of the handheld electronic device, and through software the device implements the selected function. The buttons are assigned pre-set functions via user inputs from the touchscreen and associated software. Also, the assignment of button function can be made by user voice command and associated software. This feature is prior art used in TV remote controls made by such companies as Google Android TV, Samsung TV, and Roku TV, called "Button Mapper," that allows the user to customize the function of the buttons on remote control by assigning different actions to each button. This essentially allows the user to remap what each button does on a TV or other device instead of being limited to the default settings.

In one application, the advantage of the one handed operation over two handed operation is when shooting a picture or video over a crowd of people such as in a concert, a parade or in a celebrity paparazzi mob scenario; in the one handed operation, the user can stretch up to the max reach, zoom and take picture/videos without the use of the other hand or the need to bring the device down to adjust the zooming input features. Currently, holding high up a smartphone and using the thumb to navigate the zoom controls on the touchscreen is almost ergonomic impossible. Additionally, since the grip on the device is not tightly secure, it's prone to slip off the users' hand and damage the expensive electronic device.

In terms of use, a method for ergonomically adapting a handheld electronic device 20 to a user, the user having a hand 500 with a finger 502 includes:

(a) providing a handheld electronic device 20 including:
a front side 22 having a display screen;
a rear side 24 disposed opposite the front side 22;
an input unit 26 disposed on the rear side 24, the input unit 26 ergonomically positionable to a plurality of different locations on the rear side 24;
(b) ergonomically positioning the input unit 26 to a location on the rear side 24 which in (c) below aligns with the finger 502 of the user; and,
(c) the user gripping the handheld electronic device 20 with the hand 500 and using the finger 502 to manipulate the input unit 26.

The method further including:
In (a) the input unit 26 including a plurality of switches 28.

The method further including:
the input unit 26 including five switches 28.

The method further including:
in (a) the rear side 24 having a longitudinal centerline 32;
in (a) a path 30 disposed on the rear side 24; and,
in (b) the input device 26 positionable along the path 30.

The method further including:
the path disposed parallel to the longitudinal centerline 32.

The method further including:
the path 30 disposed perpendicular to the longitudinal centerline 32.

The method further including:
the path 30 being one of a circle, a rectangle, and an ellipse.

The embodiments of the handheld electronic device and method described herein are exemplary and numerous modifications, combinations, variations, and rearrangements can be readily envisioned to achieve an equivalent result, all of which are intended to be embraced within the scope of the appended claims. Further, nothing in the above-provided discussions of the handheld electronic device and method should be construed as limiting the invention to a particular embodiment or combination of embodiments. The scope of the invention is defined by the appended claims.

I claim:

1. A method for ergonomically adapting a handheld electronic device to a user, the user having a hand with a finger, the method comprising:

(a) providing a handheld electronic device including;
a front side having a display screen;
a rear side disposed opposite said front side;
an input unit disposed on said rear side, said input unit ergonomically positionable to a plurality of different locations on said rear side;

(b) ergonomically positioning said input unit to a location on said rear side which in (c) below aligns with the finger of the user; and, (c) the user gripping said handheld electronic device with the hand and using the finger to manipulate said input unit.

2. The method of claim 1 further including:

in (a) said input unit including a plurality of switches.

3. The method of claim 2 further including:

said input unit including five switches.

4. The method of claim 1 further including:

in (a) said rear side having a longitudinal centerline;

in (a) a path disposed on said rear side; and, in (b) said input device positionable along said path.

5. The method of claim 4 further including:

said path disposed parallel to said longitudinal centerline.

6. The method of claim 4 further including:

said path disposed perpendicular to said longitudinal centerline.

7. The method of claim 4 further including:

said path being one of a circle, a rectangle, and an ellipse.

8. The method of claim 1 further including:

in (a) said back side having a centerline; and, in (c) the finger naturally angling across said centerline wherein the finger aligns with said input unit.

9. The method of claim 1 further including:

in (a) providing a lock which locks said input unit in place; and, after (b) locking said input unit in place.

10. The method of claim 1 further including:

in (b) said positioning effected under computer control.

11. A method for ergonomically adapting a handheld electronic device to a user, the user having a hand with a finger, the method comprising:

(a) providing a handheld electronic device including;

a front side having a display screen;

a rear side disposed opposite said front side, said rear side having a centerline;

an input unit disposed on said rear side, said input unit ergonomically positionable to a plurality of different locations on said rear side;

a lock for locking said input unit in place;

(b) ergonomically positioning said input unit to a location on said rear side which in (d) below aligns with the finger of the user;

(c) locking said input unit in place on said rear side; and, (d) the user gripping said handheld electronic device with the hand and using the finger to manipulate said input unit; said gripping Including the finger naturally angling across said centerline wherein the finger aligns with said input unit.

\* \* \* \* \*